United States Patent [19]

Hirai et al.

[11] Patent Number: 5,264,953
[45] Date of Patent: Nov. 23, 1993

[54] LIQUID CRYSTAL DISPLAY APPARATUS FOR PROVIDING A GRAY SCALE AND A PROJECTION TYPE LIQUID CRYSTAL DISPLAY APPARATUS

[75] Inventors: Yoshinori Hirai; Masaya Kunigita; Tomoki Gunjima, all of Yokohama, Japan

[73] Assignee: Asahi Glass Company Ltd., Tokyo, Japan

[21] Appl. No.: 810,855

[22] Filed: Dec. 20, 1991

[30] Foreign Application Priority Data

Dec. 20, 1990 [JP] Japan .................................. 2-411903

[51] Int. Cl.$^5$ .............................................. G02F 1/133
[52] U.S. Cl. ........................................ 359/55; 359/51; 353/89; 358/60
[58] Field of Search .............. 359/54, 55, 51, 52, 359/102; 353/89; 358/60

[56] References Cited

U.S. PATENT DOCUMENTS

| | | | |
|---|---|---|---|
| 4,435,047 | 3/1984 | Fergason | 359/51 |
| 4,662,720 | 5/1987 | Fergason | 350/51 |
| 4,678,282 | 7/1987 | Yamu et al. | 350/51 |
| 4,834,508 | 5/1989 | Fergason | 359/51 |
| 4,834,509 | 5/1989 | Gunjima et al. | 359/94 |
| 5,150,232 | 9/1992 | Gunkima et al. | 359/51 |

Primary Examiner—William L. Sikes
Assistant Examiner—Huy K. Mai
Attorney, Agent, or Firm—Oblon, Spivak, McClelland, Maier & Neustadt

[57] ABSTRACT

A liquid crystal display apparatus comprises a liquid crystal display element comprising an active matrix substrate having an active element for each picture element electrode, a counter electrode substrate provided with a counter electrode and a liquid crystal and solidified matrix composite material, disposed between the active matrix substrate and the counter electrode substrate, which includes a nematic liquid crystal dispersed and held in a solidified matrix, said nematic liquid crystal being such that the refractive index of the liquid crystal is changed depending on states of applying a voltage wherein in a state, the refractive index of the liquid crystal substantially coincides with that of the solidified matrix to thereby pass light and in the other state, the former doesn't coincide with the latter to thereby cause the scattering of light, and a driving circuit to drive the liquid crystal display element, wherein plural kinds of voltage is selectively applied to the picture elements in order to display specified states of the picture elements of the display element.

31 Claims, 6 Drawing Sheets

FIGURE 8

LINE (n)

|   | 1 | 2 | 3 | 4 |
|---|---|---|---|---|
| 1 | $A_{11}$ | $A_{12}$ | $A_{13}$ | $A_{14}$ |
| 2 | $A_{21}$ | $A_{22}$ | $A_{23}$ | $A_{24}$ |
| 3 | $A_{31}$ | $A_{32}$ | $A_{33}$ | $A_{34}$ |
| 4 | $A_{41}$ | $A_{42}$ | $A_{43}$ | $A_{44}$ |

ROWS (m)

FIGURE 9

PICTURE ELEMENTS

| $A_{11}$ | $A_{12}$ |
|---|---|
| $A_{21}$ | $A_{22}$ |

R

| 1 | 2 |
|---|---|
| 3 | 4 |

G

| 4 | 1 |
|---|---|
| 3 | 2 |

B

| 3 | 4 |
|---|---|
| 1 | 2 |

LIQUID CRYSTAL DISPLAY APPARATUS FOR PROVIDING A GRAY SCALE AND A PROJECTION TYPE LIQUID CRYSTAL DISPLAY APPARATUS

BACKGROUND OF THE INVENTION

1. Field of the Invention

The present invention relates to a liquid crystal display apparatus having an active element for each picture element electrode and a projection type liquid crystal display apparatus.

2. Discussion of Background

In recent years, liquid crystal displays have been widely used for personal word processors, hand-held computers, portable TV sets and so on, taking the advantages of low power consumption, low driving voltage and so on. Of the liquid crystal displays, active matrix liquid crystal display elements having an active element for each picture element electrode have particularly been noted and developed.

As such liquid crystal display elements, there was a proposal on liquid crystal display elements in which a dynamic scattering mode (DSM) liquid crystal is used. However, the liquid crystal display element of this type had a disadvantage of large current consumption because a high value of electric current passed in the DSM liquid crystal. Now, liquid crystal display elements in which a twist nematic (TN) type liquid crystal is used have been widely used. For instance, portable TVs have been widely commercialized. Since the TN type liquid crystal display element has a very small leak current and a small power consumption, it is suitable for using a battery as a power source.

When the liquid crystal display element is used for DS mode, the leak current of the liquid crystal itself is large. Accordingly, it was necessary to provide a large storage capacitance in parallel to each picture element, and the power consumption of the liquid crystal display element itself is large.

In the TN mode, since a leak current in the liquid crystal itself is very small, it is unnecessary to provide a large storage capacitance and the power consumption of the liquid crystal display element itself can be small.

In the TN mode liquid crystal, however, there is a problem that the transmittance of light is small because two polarization plates are required. In particular, when a color filter is used for obtaining a colored display, only several percents of incident light can be utilized. It is, therefore, necessary to use a strong light source, and as a result power consumption is increased.

Further, the TN mode liquid crystal display element has disadvantages of requiring a very strong light source for projecting a picture image on a projection screen, difficulty in obtaining a high contrast on the projection screen, and adverse effect to the liquid crystal display element due to heat from the light source.

In order to solve the problems in the TN mode liquid crystal display element, there is proposed such a mode that a liquid crystal and polymer composite material in which a nematic liquid crystal is dispersed and held in a polymer matrix is used, and a low voltage such as 10 V or lower is sufficient to drive it by utilizing the scattering-transparent characteristics.

However, in the conventional liquid crystal and polymer composite material, there was hysteresis in the voltage-transmittance characteristics, that is, there was a problem that the transmittance during the increase of voltage is different from that during the decrease of voltage. Accordingly, there was a problem of a phenomenon of image-sticking wherein a picture image which had appeared in the display just before the changing of picture remained in the present display.

SUMMARY OF THE INVENTION

The present invention is to eliminate the problems of the conventional techniques and to provide a liquid crystal display apparatus and a projection type liquid crystal display apparatus which reduce a phenomenon of image-sticking due to the hysteresis of the liquid crystal and polymer composite material.

In accordance with the present invention, there is provided a liquid crystal display apparatus which comprises:

a liquid crystal display element comprising an active matrix substrate having an active element for each picture element electrode, a counter electrode substrate provided with a counter electrode and a liquid crystal and solidified matrix composite material, disposed between the active matrix substrate and the counter electrode substrate, which includes a nematic liquid crystal dispersed and held in a solidified matrix, said nematic liquid crystal being such that the refractive index of the liquid crystal is changed depending on states of applying a voltage wherein in a state, the refractive index of the liquid crystal substantially coincides with that of the solidified matrix to thereby pass light, and in the other state, the former doesn't coincide with the latter to thereby cause the scattering of light, and a driving circuit to drive the liquid crystal display element, wherein plural kinds of voltage are selectively applied to the picture elements in order to display specified states of the picture elements of the display element.

Further, in accordance with the present invention, there is provided a projection type liquid crystal display apparatus which comprises:

a liquid crystal display apparatus as described in the above, a projection light source system, and a projection optical system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a diagram showing an example of arrangement of picture elements;

FIG. 9 is a diagram showing an order of driving picture elements for three liquid crystal display elements having red, green and blue colors;

DETAILED DESCRIPTION OF THE PREFERRED EMBODIMENTS

Figure 1:
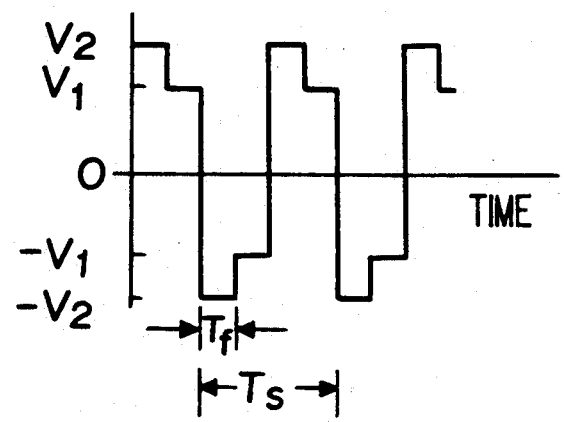
FIG. 1 is a waveform diagram showing an example of the state of voltages $V_1$ and $V_2$ applied to a specified picture element.

In the following, preferred embodiments of the present invention will be described.

The liquid crystal display element of the present invention comprises a liquid crystal and solidified matrix composite material, capable of electrically controlling a light scattering state and a light transmission state, as a liquid crystal material which is interposed between the active matrix substrate and the counter electrode substrate. Accordingly, polarization plates are no longer necessary, and the transmittance of light at the time of transmission can be greatly improved. Accordingly, a bright display is possible. In particular, when the liquid crystal display element of the present invention is used for a projection type display apparatus, a projected image having brightness and a high contrast ratio is obtainable.

Further, since orientation treatment indispensable for the TN type liquid crystal display element is not necessary and problems such as the destruction of the active elements caused by the static electricity generated upon treatment can also be avoided, production yield of the liquid crystal display element can be improved remarkably.

Furthermore, since the liquid crystal and solidified matrix composite material is in a state of film after curing, it can reduce such problems as short-circuiting between the substrates due to the pressure applied thereto and the destruction of the active elements caused by the movement of the spacers.

Further, since the specific resistivity of the liquid crystal and solidified matrix composite material is the same as that of the TN mode, it is not necessary to dispose a large storage capacitance on each picture element as in the case of the DSM, so that the design for the active element is easy and the electric power consumption by the liquid crystal display element can be kept low. Accordingly, since the material can be produced by merely eliminating the step of forming an oriented film from the production steps for the conventional TN mode crystal display element, the production is easy.

The specific resistivity of the liquid crystal and solidified matrix composite material is, preferably, not less than $5 \times 10^9$ Ω cm, and more preferably, not less than $10^{10}$ Ω cm in order to minimize the voltage drop due to leak current etc., in which there is no requirement for providing a large storage capacitance on each of the picture element electrodes.

As the active element, there may be used, for example, a transistor, a diode, a non-linear resistor element, and two or more of active elements may be disposed to one picture element if necessary. The liquid crystal and solidified matrix composite material is put between an active matrix substrate which is provided with an active element and a picture element electrode connected therewith and a counter electrode substrate provided with a counter electrode to thereby constitute a liquid crystal display element.

The liquid crystal display element of the present invention can be used not only as a direct view type display apparatus but also as a projection type display apparatus. When the liquid crystal display element of the present invention is used as the direct view type display apparatus, a display apparatus may be constituted in combination with a light source, a lens, a prism, a mirror, a diffusion plate, a light absorbing material, a color filter and so on in accordance with the display characteristics which are desired to obtained.

The liquid crystal display element of the present invention is, in particular, suitable for a projection type display apparatus, and the projection type liquid crystal display apparatus can be constituted by combining the liquid crystal display element with a projection light source, a projection optical system and so on.

A conventional projection light source and a conventional projection optical system such as a lens may be used for the projection light source and the projection optical system respectively. Generally, the liquid crystal display element is arranged in between the light source and the projection optical system.

In the present invention, since such a liquid crystal display element that it comprises an active matrix substrate provided with an active element for each picture element electrode, a counter electrode substrate provided with a counter electrode and a liquid crystal and solidified matrix material which is interposed between the active matrix substrate and the counter electrode substrate and in which a nematic liquid crystal having a positive dielectric anisotropy is dispersed and held in a solidified matrix such as a polymer matrix, the refractive index of the liquid crystal is changed depending on a state of voltage applied and the refractive index of the solidified matrix substantially agrees with the refractive index of the liquid crystal used, is used as the liquid crystal display element, a display having a high contrast and brightness can be easily obtained.

In particular, since the refractive index of the solidified matrix substantially agrees with the ordinary refractive index ($n_0$) of the liquid crystal used, transmission of light from the portion where the electrodes between adjacent picture elements are not opposed can be prevented. Further, since the transmittance of light is large in a transparent time, a display having more brightness and a high contrast ratio can be easily obtained.

Further, since a polymer matrix is used for the solidified matrix, it is easy to prepare a liquid crystal and polymer composite material having desired characteristics.

In the present invention, specifically, a liquid crystal and solidified matrix composite material comprising a solidified matrix having a large number of fine holes and a nematic liquid crystal filled in the fine holes, is used. The liquid crystal and solidified matrix composite material is put between the active matrix substrate and the counter electrode substrate to thereby constitute the liquid crystal display element. When a voltage is applied across the electrodes of the liquid crystal display element, the refractive index of the liquid crystal is changed, and the relation between the refractive index of the solidified matrix and the refractive index of the liquid crystal is changed. Namely, when the refractive indices of the both members are in agreement with each other, a state of transmission is provided, and when not, a state of scattering is provided.

The liquid crystal and solidified matrix composite material comprising the solidified matrix, such as polymer, has a large number of fine holes and the liquid crystal filled in the fine holes has such a structure that the liquid crystal is sealed in vacuoles such as microcapsules wherein the individual microcapsules may not be completely independent or the individual vacuoles may be communicated with each other through fine gaps like a porous material such as porous glass or porous resin.

As the solidified material in the liquid crystal and solidified matrix composite material, glass, ceramics resin or another known material can be used. However, use of the resin is preferable from the standpoint of manufacturing as described before. Therefore, description will be made as an example wherein the resin, i.e. the liquid crystal and polymer composite material is used.

The liquid crystal and polymer composite material used for the liquid crystal display element can be prepared by mixing a nematic liquid crystal and a material for forming the polymer matrix into a solution or a latex, by curing the solution or latex by the application of light or heat, or by removing solvent or by subjecting it to reactive curing thereby separating the polymer matrix and dispersing the nematic liquid crystal into the polymer matrix.

Use of the photo-curable or heat-curable type compound is preferred since it can be cured in an enclosed system.

In particular, use of a photo-curable type compound is preferred since it can be cured in a short period of time with little influence of heat.

As a specific production method, the cell may be formed by using a sealing material, uncured mixture of the nematic liquid crystal and the curable compound is injected from the injection port in the same manner as in the conventional TN type nematic liquid crystal display element, and after sealing the injection port, they can be cured by light irradiation or heating.

The liquid crystal display element according to the present invention may also be prepared without forming an empty cell. Namely, an uncured mixture of the nematic liquid crystal and the curable compound is supplied on a substrate provided with a transparent electrode as a counter electrode, and on that substrate, an active matrix substrate having an active element for each picture element electrode is overlaid, followed by curing the material by means of light-irradiation or the like to form a cell.

Further, the uncured mixture of the nematic liquid crystal and the curable compound may be incorporated with spacers for controlling the inter-substrate gap such as ceramic particles, plastic particles or glass fibers, pigments, dyes, viscosity controllers or any other additives which does not adversely influence to the performance of the liquid crystal display element of the present invention.

During the curing step of the liquid crystal display element of the present invention, if the element is cured under the condition that a sufficiently high voltage is applied to only a specified portion, it is possible to render that portion to be a state of normally light transmittance or normally light scattering. Accordingly, when a fixed display is desired, such normally light transmittance or normally light scattering portion may be formed.

In the present invention, the refractive index of the liquid crystal is changed depending on application of voltage.

In one state, light is transmitted when the refractive index of the solidified matrix substantially agrees with the refractive index of the liquid crystal, and in the other state, the light is scattered (opaque) when they do not agree with each other. In particular, it is preferable that the refractive index of the matrix is in agreement with the ordinary refractive index ($n_0$) of the liquid crystal used.

The scattering characteristics of the liquid crystal display element is higher than that of the conventional DSM type liquid crystal display element, whereby a display having a high contrast ratio is obtainable.

The primary purpose of the present invention is to provide a liquid crystal display apparatus using the above-mentioned liquid crystal and solidified matrix composite material capable of reducing a phenomenon of image-sticking due to hysteresis by improving the way of driving the liquid crystal display element.

In the conventional liquid crystal and solidified matrix composite material, there appeared hysteresis in the voltage-transmittance characteristics, this causing a trouble in gray scale displaying. The hysteresis is a phenomenon that transmittance is different between a course of increasing the voltage and a course of decreasing the voltage. If the hysteresis exists, an information which has appeared in a picture image remains in gray scale displaying. Namely, the image-sticking is apt to occur to thereby deteriorate the quality of the picture image.

Figure 3:
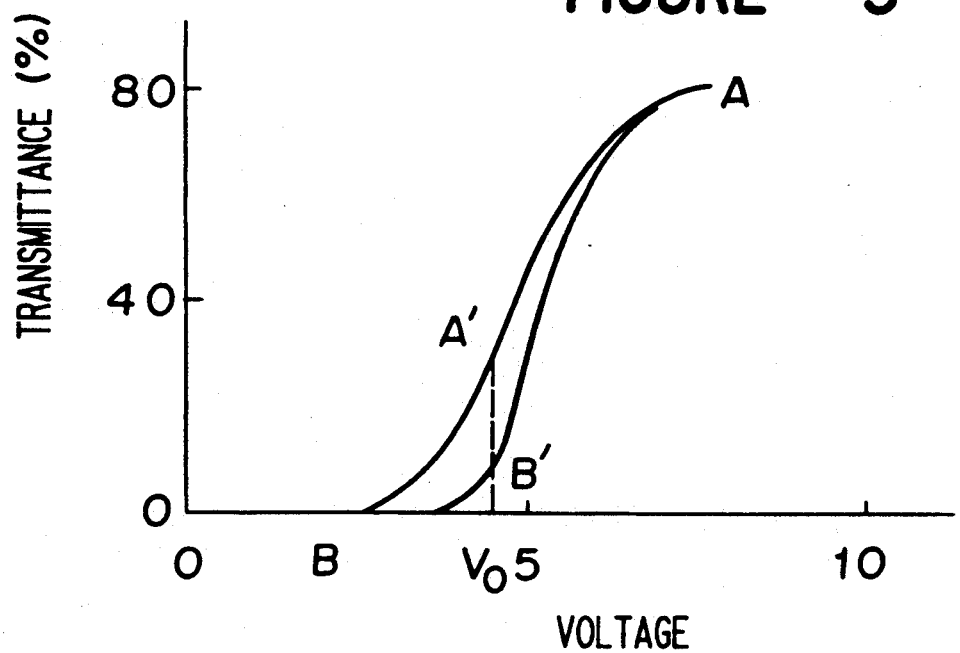
FIG. 3 is a diagram showing hysteresis in the voltage-transmittance characteristics of the liquid crystal and solidified matrix composite material.

FIG. 3 is a diagram showing hysteresis in the voltage-transmittance characteristics of the liquid crystal and solidified matrix composite material and the principle of the sticking of a picture image resulting from the hysteresis. In a preferred embodiment of the present invention, the refractive index of the liquid crystal assumes the ordinary refractive index when a voltage is applied so that the ordinary refractive index substantially agrees with the refractive index of a solidified matrix to thereby permit the transmission of light.

As shown in FIG. 3, the transmittance of the liquid crystal and solidified matrix composite material is different between a course of increasing the voltage and a course of decreasing the voltage. Generally, the transmittance during the decreasing of the voltage is higher than that of increasing the voltage. On account of this, two picture elements are rendered to have two kinds of transmission states as shown in FIG. 3 (a transparent state as indicated by A and a scattering state indicated by B). When a voltage $V_0$ which is lower than a voltage which gives the transparent state is applied so that a semi-transparent state is provided, the transmittance of the picture element having the state A does not become equal to that of the picture element having the state B, and instead of that, they take states A' and B' in FIG. 3 respectively. If the same voltage $V_0$ is applied, the same transmittance has to be obtained. In fact, however, the different transparent states are provided, whereby an information of a picture image which has been displayed just before remains. This is a phenomenon of image-sticking due to the hysteresis. Such hysteresis creates a problem that gray scale driving can not be sufficiently obtained.

One of the causes of the hysteresis in the liquid crystal and solidified matrix composite material is because of the structure of the liquid crystal and solidified matrix composite material in which liquid crystal is dispersed and held in a solidified matrix. Namely, there is the hysteresis due to the interaction of liquid crystal particles which exist in the solidified matrix in a separate state. The magnitude of the hysteresis is determined by an elastic energy stored in the liquid crystal which is held in the solidified matrix, an electrical energy resulting by an electric field applied from the outside and an interaction energy between the liquid crystal particles existing in the solidified matrix in a separate state. Accordingly, the hysteresis can be reduced by finding the optimized balance of the energies, and with the result of this an excellent display without any image-sticking can be obtained even in a gray scale display.

The purpose of the present invention is to provide a liquid crystal display apparatus having a high contrast ratio, a high brightness and excellent response and capable of reducing the hysteresis.

The primary object of the present invention is to provide a display capable of driving it with a low voltage, having a high brightness and a high contrast ratio and substantially free from image-sticking.

In driving the picture elements in the present invention, a plurality of voltages are selectively applied in order that the picture elements are displayed in specified states. Specifically, the picture elements are driven by an image signal which is subjected to amplitude modulation of voltages having two or more kinds of different levels wherein the image signal is given to the picture elements in each one field or a plurality of fields. In particular, when the picture elements are alternately driven by changing the image signal for each one field, a great advantage can be obtained. The unit of one field referred to in this description means a minimum unit of application of voltage, which is different from one field referred to in a TV broadcast (60 fields per second in a case of NTSC). However, when the present invention is used for TV, a plurality of fields may be used in a field period referred to in the TV broadcast.

An example of driving picture elements by changing an image signal in each one field will be described. Namely, when a certain picture element is considered, it is applied with different voltages in different fields even when the same picture is displayed.

Figure 2:
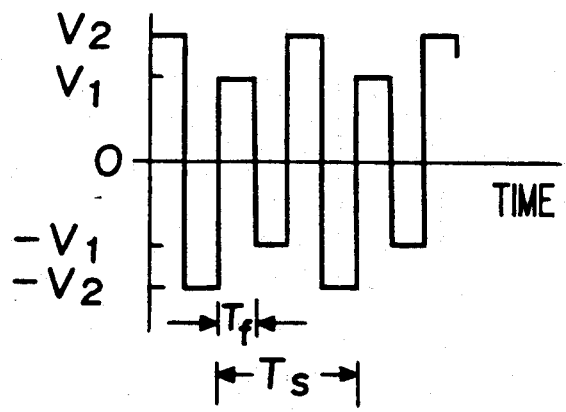
FIG. 2 is a waveform diagram showing another example of the state of voltages applied to the specified picture element.

Specifically, voltages having the waveforms as shown in FIGS. 1 and 2 are exemplified. In these embodiments, voltages $V_1$ and $V_2$ having two kinds of amplitude are used. In the embodiment of FIG. 1, a course of $+V_2 \rightarrow +V_1 \rightarrow -V_2 \rightarrow -V_1$ is repeated. In this case, the static optical characteristics (transparent characteristics) are determined in the relation of a field period $T_f$ to a time (response time) required for optical response in the voltage change of $V_1$ and $V_2$ to the liquid crystal and solidified matrix composite material.

In order to simplify description, a case of $V_1 < V_2$ will be described. Since the hysteresis is small in a high transmittance region, it can be considered that there is no difference between $V_1$ and $V_2$, i.e. $V_1 = V_2$. However, in the description of the present application, two kinds of voltage, i.e. $V_1$ and $V_2$ are used in order to improve the hysteresis in at least a low transmittance region.

In this description, since the liquid crystal and solidified matrix composite material which is rendered to be a transparent state when a voltage is applied is used, the low transmittance region is a low voltage region and the high transmittance region is a high voltage region. The low transmittance region means a region in which the transmittance is low. If definition of a numerical value is required, it is said that the region has a transmittance of 50% or lower.

In the present invention, since there is the problem of hysteresis in a low transmittance region, an ON time ($T_r$) during which a voltage is applied and an OFF time ($T_d$) during which the voltage is removed are defined as follows. With this respect, although light passes through even in a state that a voltage of 0 V is applied, the transmittance in this state is defined as 0%, and the transmittance in a state that a sufficiently high voltage is applied is defined as 100%. Further, the transmittance in a low transmittance region is defined as 20%. The transmittance is obtained by the measurement in the actual use of the liquid crystal display apparatus in the present invention. In a case of the projection type liquid crystal display apparatus, the transmittance is obtained by the measurement on a projection screen.

$T_r$ represents a time in which an optical change which shows the transmittance increasing from a state of the application of the voltage $V_1$ to a state of the application of the voltage $V_2$ reaches 90% (transmittance change from 0% to 18%), and $T_d$ represents a time in which an optical change which shows the transmittance decreasing from the state of the application of the voltage $V_2$ to the state of the application of the voltage $V_1$ reaches 90% (transmittance change from 20% to 2%) in a case that the applied voltages $V_1$ and $V_2$ ($V_1 < V_2$) to Obtain a transmittance of 20% are used.

$T_r$ and $T_d$ of the liquid crystal and solidified matrix composite material has a relation of $T_r > T_d$ because a voltage to be applied in a low transmittance region is low, whereby $T_r$ is generally delayed.

The present invention is to reduce the image-sticking phenomenon due to hysteresis in a low transmittance region. For this purpose, $$T_d > 1.5 \cdot T_f \ldots \quad (1A)$$

is satisfied. Further, it is preferable to satisfy the equation:

$$1.5 \cdot T_f < T_r \ldots \quad (2A)$$

in order to suppress a flicker of picture image. Namely, in consideration of suppressing both the image-sticking and the flicker of picture image, use of the following formula:

$$T_d < 1.5 \cdot T_f < T_r \ldots \quad (3A)$$

is preferable.

If the characteristics of $T_r$ and $T_d$ are opposite, the following formula:

$$T_r < 1.5 \cdot T_f \ldots \quad (1B)$$

should be satisfied in order to reduce the image-sticking phenomenon due to hysteresis in a low transmittance region. Further, in order to suppress the flicker of a picture image in addition to reducing the image-sticking, it is preferable to satisfy the following formula:

$$1.5 \cdot T_f < T_d \ldots \quad (2B)$$

Namely, in consideration of both formulas, $$T_r < 1.5 \cdot T_f < T_d \ldots \quad (3B)$$

is preferable.

When the values $T_r$ and $T_d$ are sufficiently longer than $T_f$, the optical response is determined by the effective value of a voltage applied. Therefore, there is no substantial difference in the electro-optical characteristics in comparison with a case of applying a rectangular wave having the same amplitude of voltage as the effective value of the voltage, and accordingly, the reduction of the image-sticking phenomenon due to hysteresis can not be expected.

When $T_r$ and $T_d$ are equal to or smaller than $T_f$, the transmittance is apt to be variable with time because the optical characteristics depend on the voltage applied. Accordingly, although the image-sticking phenomenon due to hysteresis can be reduced, a flicker of a picture image results.

As described above, it is preferable to satisfy the equation (1A) or (1B) in order to reduce the image-sticking phenomenon. Further, it is preferable to satisfy the equation (3A) or (3B) in order to suppress the flicker in addition to the reduction of the image-sticking phenomenon.

In this case, when the voltages $V_1$ and $V_2$ ($V_1 < V_2$) are applied, there are found two kinds of changes between $V_1$ and $V_2$. In one of the changes ($V_2 \rightarrow V_1$ in a case of the equation (3A) and $V_1 \rightarrow V_2$ in a case of the equation (3B)), the transmittance is changed by optically following-up the change of the voltage. In the other case ($V_1 \rightarrow V_2$ in the case of the equation (3A), $V_2 \rightarrow V_1$ in the case of the equation (3B)) there is little optical follow-up. Accordingly, the optical characteristics (transmittance) are determined by optical conditions which have changed earlier than $T_f$. Accordingly, it is possible to suppress the occurrence of the flicker and to reduce the image-sticking phenomenon due to hysteresis by suitably selecting so as to meet a static electro-optical characteristic of the liquid crystal and solidified matrix composite material using the group of $V_1$ and $V_2$.

FIG. 1 is a waveform diagram showing an example in which the voltages $V_1$ and $V_2$ are applied to a specified picture element in accordance with the present invention, wherein the picture element is repeatedly driven with four fields of $+V_2 \rightarrow +V_1 \rightarrow -V_2 \rightarrow -V_1$. The time of each field is indicated by $T_f$, and $4T_f$ forms one scanning period $T_s$. In the example of FIG. 1, the one scanning period $T_s$ had to be formed by $4T_f$ in order to obtain a correct alternating current by each image signal for each picture element. The one scanning period $T_s$ may be formed by $2T_f$ if it is sufficient to obtain an alternating current in an average view.

FIG. 2 is a waveform diagram showing another example in which the voltages $V_1$ and $V_2$ are applied to a specified picture element in accordance with the present invention, wherein the picture element is repeatedly driven with the 4 fields of $+V_2 \rightarrow -V_2 \rightarrow +V_1 \rightarrow -V_1$. Although the voltage $V_2$ is applied at the beginning in this example, any voltage $-V_2$, $+V_1$ or $-V_1$ may be applied at the beginning, and the order of the application of the voltages may be changed.

Figure 4:
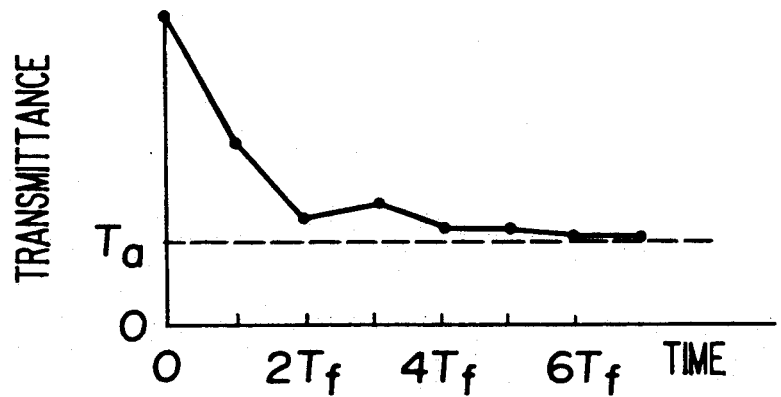
FIG. 4 is a diagram showing a change of transmittance obtained when the voltages $V_1$ and $V_2$ shown in FIG. 1 are alternately applied to the picture element in a transparent state under the condition of formula 3A.
Figure 5:
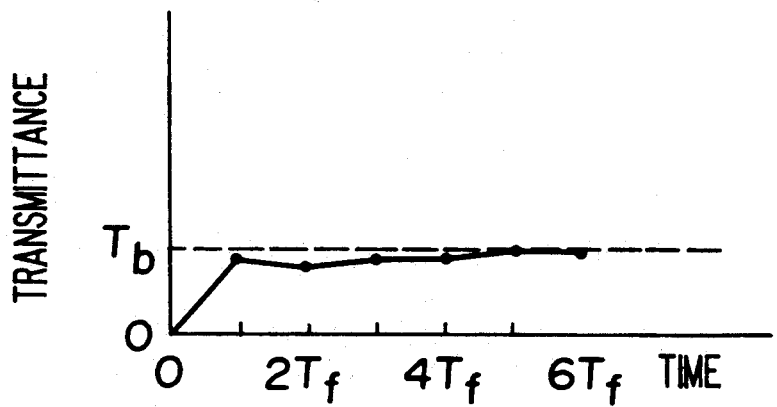
FIG. 5 is a diagram showing a change of transmittance obtained when the voltages $V_1$ and $V_2$ are alternately applied to the picture element in a scattering state under the condition of a formula 3A.

FIGS. 4 and 5 show changes of transmittance in cases that the voltages $V_1$ and $V_2$ are alternately applied under the condition of the formula (3A) wherein the voltages $V_1$ and $V_2$ assume the driving waveform as shown in FIG. 1. In FIGS. 4 and 5, the ordinate represents transmittance and the abscissa represents time. FIG. 4 shows that the initial state is in a transparent state and FIG. 5 shows that the initial state is in a scattering state. Each transmittance $T_a$ or $T_b$ indicates the apparent ultimate transmittance obtained when the driving waveform as shown in FIG. 1 is continuously applied, and $T_a$ is substantially equal to $T_b$. In FIGS. 4 and 5, the application of voltages $V_1$ and $V_2$ is to obtain a desired transmittance $T \approx T_a \approx T_b$. The desired transmittance may not always be the before-mentioned 20% transmittance, but is such one in a low transmittance region. Further, the voltages $V_1$ and $V_2$ referred to in the following description imply voltages having different values and they are not the same as the voltages $V_1$ and $V_2$ in the case of 20% transmittance.

In FIG. 4, the transmittance obtained just after the completion of the first $T_f$ period has a fairly high value. However, it gradually approaches $T_a$ at the second field and after. In FIG. 5, the transmittance gradually approaches $T_b$ with the lapse of time. $T_a$ and $T_b$ become substantially equal values as shown in FIGS. 4 and 5, and there is little image-sticking phenomenon due to hysteresis in apparent view, and further, the flicker is small. It is of course, preferable to reduce the hysteresis in the liquid crystal and solidified matrix composite material used. This is because when the hysteresis is extremely large, correction by driving becomes insufficient and it is difficult to suppress the image-sticking phenomenon to the extent that the picture image is not deteriorated. Accordingly, it is preferred to select materials for the liquid crystal and solidified matrix composite material and the structure of it.

When the ordinary method of driving is used, it is necessary to strictly control the characteristics of the liquid crystal and solidified matrix composite material, and accordingly, the liquid crystal and solidified matrix composite materials to be used are limited. However, it is possible to use a liquid crystal and solidified matrix composite material having a slight hysteresis in combination with the driving method. Accordingly, it is advantageous that materials for and the structure of the liquid crystal and solidified matrix composite material can be determined in consideration of other characteristics (contrast, driving voltage and so on).

Since a response time given by the liquid crystal and solidified matrix composite material varies depending on the voltages $V_1$ and $V_2$ used in combination, it is important that the voltages $V_1$ and $V_2$ be suitably determined in a driving method which greatly reduces the image-sticking and suppresses the flicker. Namely, it is important how two or more voltages used are determined. These voltages should be determined at each level in a gray scale display.

In the present invention, a plurality of voltages are applied in at least a low transmittance region in a gray scale display. However, only single voltage may be applied in a high transmittance region because the hysteresis is small.

A group consisting of a plurality of voltages may be determined depending on a gray scale to be displayed and the characteristics of the liquid crystal and solidified matrix composite material used. Specifically, it is desirable to satisfy the following relation.

When it is assumed that the highest voltage among a group of voltages applied to a certain picture element in order to display a specified state is $V_2$; the lowest voltage among the voltages is $V_1$ and voltages which respectively produce 50% and 90% of the saturated transmittance at the time of increasing the voltages are applied are $V_{50A}$ and $V_{90A}$ respectively.

$$V_x = 0.5 \times V_{90A} \times (V_2 - V_{50A})/(V_{90A} - V_{50A}) \quad (4)$$

When $V_x$ is either larger one between a value obtained by the above formula (4) and 0 V, the values $V_1$ and $V_2$ should satisfy the following formula (5):

$$V_x \leq V_1 < V_2 \quad (5)$$

Further, the effect obtained by the present invention is particularly effective when the difference $\Delta V$ between the voltages $V_1$ and $V_2$ has a certain level or higher in a gray scale region having a large hysteresis. Specifically, it is a case that when a voltage at which the transmittance becomes 50% of the saturated transmittance at the time of decreasing the voltage is $V_{50B}$, the difference $\Delta V_{AV}$ between the voltages $V_1$ and $V_2$ in average values in the region of threshold voltage $V_{th} < V_2 < V_{50A}$ is greater than $\Delta V_{50} = V_{50A} - V_{50B}$. Under such conditions, the voltage difference between $V_1$ and $V_2$ becomes greater than the voltage width which the hysteresis possesses, whereby in apparent view the hysteresis and the image-sticking can be effectively reduced. Here, Vth represents the threshold voltage of the voltage-transmittance characteristics at the time of increasing the voltage.

In the following, some examples of the combination of $V_1$ and $V_2$ and an effect expected by the combination will be described.

A gray scale step x is an arbitrary variable, which can be modulated and used so that excellent gray scale characteristics can be obtained in a final picture image. Specifically, there are 8 gray scale, 16 gray scale, 64 gray scale and so on.

Figure 6:
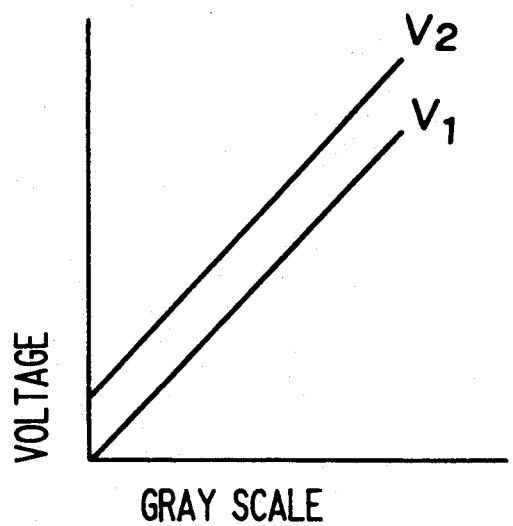
FIG. 6 is a diagram showing a relation of voltages $V_1$ and $V_2$ to gray scale.

FIG. 6 is a diagram showing an example of a driving method wherein $V_1$ is always lower than $V_2$ by a constant voltage $\Delta V$. In this example, the left end of the line which indicates $V_1$ being represented as 0 V. However, when the left end of this line is represented as 0 V at a position deviated slightly to the right side, $V_1$ should be lower than $V_2$ by a constant voltage $\Delta V$ in the region of $V_1 \geq 0$ V.

Figure 7:
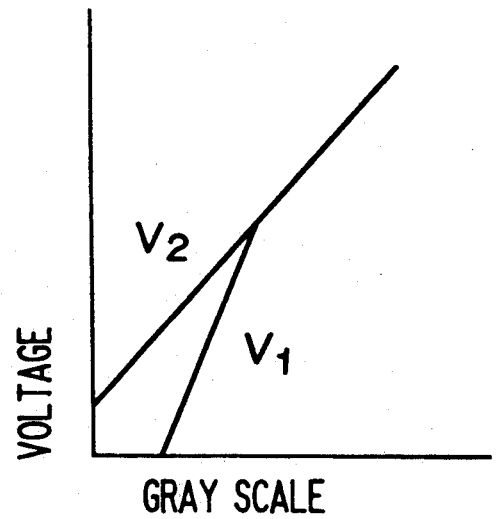
FIG. 7 is a diagram showing another relation of voltages $V_1$ and $V_2$ to gray scale.

FIG. 7 is a diagram showing an example of a driving method wherein $V_1 = V_2$ in a constant voltage or higher. Namely, the voltage difference $\Delta V$ between the two kinds of voltages $V_1$ and $V_2$ is gradually increased as the voltages applied are decreased in the region of $V_1 = 0$ V in at least a low voltage region. In a transparent state while voltages are applied, the voltage difference $\Delta V$ is gradually increased as the transmittance decreases.

In considering an effect to be expected, it is necessary to consider the voltage dependence of the response characteristics of the liquid crystal and solidified matrix composite material. In general, the response time of the liquid crystal and solidified matrix composite material depends on the physical properties of materials and the size and shape of the liquid crystal particles dispersed in the matrix. A large change can be obtained by changing these factors For instance, in a liquid crystal and solidified matrix composite material having the response characteristics as shown in Table 1, the relation of the formula (3A) is established in the entire region. Accordingly, the effect of reducing the image-sticking as described before can be expected in the entire region, and the image-sticking can be reduced as a whole by driving picture elements by using the combination of voltages as shown in FIG. 6.

The indications "low, medium and high" in the applied voltage levels $V_1$ and $V_2$ in the Tables 1 and 2 respectively indicate voltages corresponding to a low transmittance state (a state in which the applied voltage is nearly 0 V), an intermediate transmittance state and a high transmittance state (a nearly saturated transmittance state), and they don't define the absolute values of transmittance.

TABLE 1

| Voltage applied ($V_1$, $V_2$) | | Relation among $T_r$, $T_d$ and $T_f$ when plural voltages $V_1$, $V_2$ are applied |
|---|---|---|
| Low | Medium | $T_d < 1.5 \cdot T_f < T_r$ |
| Low | High | $T_d < 1.5 \cdot T_f < T_r$ |
| Medium | High | $T_d < 1.5 \cdot T_f < T_r$ |

On the other hand, in a liquid crystal and solidified matrix composite material having the response characteristics as shown in Table 2, the formula (3A) is satisfied only in a low transmittance region. Accordingly, when the combination of the applied voltages ($V_1$, $V_2$) is (low, medium) or (low, high), the effect of reducing the image-sticking can be expected. However, the combination of (low, high) is apt to occur a flicker. In such a case, the combination as shown in FIG. 7 is generally effective. When the combination as shown in FIG. 6 is used in the liquid crystal and solidified matrix composite material having the response characteristics as in Table 2, the image-sticking can be reduced, however, a large flicker is apt to occur in a high transmittance region.

TABLE 2

| Voltage applied ($V_1$, $V_2$) | | Relation among $T_r$, $T_d$ and $T_f$ when plural voltages $V_1$, $V_2$ are applied |
|---|---|---|
| Low | Medium | $T_d < 1.5 \cdot T_f < T_r$ |
| Low | High | $T_d < 1.5 \cdot T_f \approx T_r$ |
| Medium | High | $T_d \approx 1.5 \cdot T_f \approx T_r$ |

As described in the above-mentioned Examples, the combination of $V_1$ and $V_2$ can be suitably determined depending on the characteristics of the liquid crystal and solidified matrix composite material used. In the liquid crystal and solidified matrix composite material which can be driven by a low effective voltage of 10 V or lower and shows a high contrast ratio, the hysteresis is generally remarkable in the region of a low transmittance state (transmittance < 40%). Accordingly, it is important that the relation of the formula (3A) is satisfied in at least the low transmittance region in order to reduce the image-sticking in that region. In particular, it is desirable that two kinds of response time $T_r$ and $T_d$ obtain a transmittance of 20% by using the applied voltages $V_1$ and $V_2$ ($V_1<V_2$) and the field period $T_f$ satisfies:

$$T_d<1.5\cdot T_f<0.7\cdot T_r \quad (3C)$$

If the above conditions are satisfied, it is possible to reduce the image-sticking due to hysteresis in a transmittance state having the greatest hysteresis. Thus, when the hysteresis is remarkable in only the low transmittance region, a plurality of voltages should not be used in a high transmittance region having a small hysteresis, and the relation of $V_1=V_2$ should be use, whereby occurrence of the flicker can be controlled.

As described above, determination can be made as to how a voltage or voltages are applied depending on the hysteresis characteristics and the response characteristics of the liquid crystal and solidified matrix composite material used. The plurality of voltages can be determined for each gray scale in consideration of $\gamma$ correction for a gray scale display.

As described above, when such a driving method is used, there takes place a flicker due to the response time. In particular, when the image-sticking is to be reduced in a state in which the relation of the formula (3A) or (3B) is not satisfied, there takes place a flicker remarkably. Even when such relation is satisfied, there may occur a slight change of transmittance with the lapse of time. The flicker observed by an observer can be suppressed by combining another known driving method.

FIG. 8 is a diagram showing an example of arranging picture elements. However, it is not always necessary to have a regular arrangement in the vertical and lateral directions, the picture elements may be disposed in a zig-zag form. Further, they may be arranged in a radial form in which the picture elements extend from a center to the entire directions (in this case, each of the picture elements has a sector shape).

For convenience of explanation, the arrangement of picture elements in the lateral direction is expressed as line (n) and the arrangement in the vertical direction is expressed as row (m). For instance, a picture element at a line n =2 and a row m =3 is expressed as a picture element $A_{23}$.

In the present invention, a viewer feels as if a flicker is reduced by driving the picture elements with a plurality of voltages wherein the voltages applied to the picture elements are shifted in at least one direction of the picture elements. For instance, when we consider four picture elements $A_{11}$, $A_{12}$, $A_{21}$ and $A_{22}$ which are adjacent to each other, a flicker can be evenly reduced by applying a voltage waveform, which is shown in Table 3, to the four picture elements. Namely, the total light energy to the four adjacent picture elements is substantially constant. Even though a flicker occurs in each of the picture elements, they are averaged in the four picture elements, whereby they are inconspicuous.

In the Example of Table 3, four voltages are applied to the four picture elements arranged adjacent to each other so as to meet the gray scale of each of the picture elements wherein the four voltages are formed by a lower positive voltage $V_1$, a higher positive voltage $V_2$, a lower negative voltage $-V_1$ and a higher negative voltage $-V_2$, and the application of the four voltages to the picture elements is finished in 4 fields.

TABLE 3

| Field | 1 | 2 | 3 | 4 |
| --- | --- | --- | --- | --- |
| Picture element $A_{11}$ | $+V_2$ | $+V_1$ | $-V_2$ | $-V_1$ |
| Picture element $A_{12}$ | $+V_1$ | $+V_2$ | $-V_1$ | $-V_2$ |
| Picture element $A_{21}$ | $-V_2$ | $-V_1$ | $+V_2$ | $+V_1$ |
| Picture element $A_{22}$ | $-V_1$ | $-V_2$ | $+V_1$ | $+V_2$ |

In this example, the optical states of the four picture elements are averaged in space by shifting the order of the voltages $V_1$ and $V_2$ applied and the signs of voltage for each picture elements, and the flicker is reduced for a viewer. The present invention is not limited to this example, but the image-sticking caused due to hysteresis can be eliminated without flicker resulting by suitably selecting the characteristics of a liquid crystal and solidified matrix composite material used, the combination of image signals applied, and the order and phase of the voltages applied to the picture elements arranged in lines and rows. Accordingly, a dynamic display having a fine half tone can be obtained.

Further, in the above-mentioned example, the order of application of the voltages of $+V_2\rightarrow+V_1\rightarrow-V_2\rightarrow-V_1\rightarrow+V_2\rightarrow$ is used and a round of application of the voltages is made in 4 fields for the four picture elements. Namely, the voltages are applied to the picture element $A_{11}$ in the order of $+V_2\rightarrow+V_1\rightarrow-V_2\rightarrow-V_1\rightarrow$. To the picture element $A_{12}$, the phase is advanced by one and the voltages are applied to it in the order of $+V_1\rightarrow-V_2\rightarrow-V_1\rightarrow+V_2\rightarrow$. To the picture element $A_{21}$, the phase is further advanced by one and the voltages are applied to it in the order of $-V_2\rightarrow-V_1\rightarrow+V_2\rightarrow+V_1\rightarrow$. To the picture element $A_{22}$, the phase is further advanced by one and the voltages are applied to it in the order of $-V_1\rightarrow+V_2\rightarrow+V_1\rightarrow-V_2\rightarrow$.

In the above example to eliminate the flicker, the four picture elements disposed adjacent to each other are arranged to form two lines and two rows to thereby form a square shape. In such a case of the picture elements arranged in a square shape, the flicker can be inconspicuous when the number of fields in a round is 2, 4 or 8. Besides this, the number of the picture elements which form a group may be two, three or more. Further, except for the square shape, a plurality of picture elements may be continuously aligned in the vertical or lateral direction.

A plurality of lines or rows may be treated as an unit. Specifically, when the order of application of the voltages of $+V_2\rightarrow+V_1\rightarrow-V_2\rightarrow-V_1\rightarrow$ is exemplified, the picture elements arranged in the odd numbered lines are driven with the voltages in the order of $+V_2\rightarrow+V_1\rightarrow-V_2\rightarrow-V_1\rightarrow$ and the picture elements arranged in the even numbered lines are driven with the voltages in the order of $-V_1\rightarrow-V_2\rightarrow+V_1\rightarrow+V_2\rightarrow$.

Further, the picture elements adjacent to each other may form a group with 1st through 4th lines in FIG. 8 or may form a group with 1st through 4th rows.

Description has been made as to the liquid crystal and solidified matrix composite material which is rendered to be in a transparent state upon the application of voltages. Accordingly, the low transmittance region corresponds to the low voltage region and the high transmittance region corresponds to the high voltage region. On the contrary, when a liquid crystal and solidified matrix composite material which is rendered to be in a scattering state upon the application of voltages is used, the low transmittance region corresponds to the high voltage region and the high transmittance region corresponds to the low voltage region. In this case, there takes place a problem of hysteresis in the high transmittance region which corresponds to the low voltage region. Further, the relation of the formula (4) is as follows. The saturated transmittance means a transmittance (low transmittance state) $T_{MIN}$ in a scattering state at the time when a sufficiently high voltage is applied. When the dimension between $T_{MIN}$ and $T_{MAX}$ (transmittance at the time of the application of 0 V, i.e. high transmittance state) is equally divided by 100, the voltage which produces 90% non-transparent (10% transparent), i.e. $(T_{90\%} - T_{MIN})/(T_{MAX} - T_{MIN}) = 10\%$ is expressed as $V_{90A}$.

When the liquid crystal display apparatus having the liquid crystal and solidified matrix composite material is used for a projection type display apparatus, there are obtainable a high contrast ratio and high brightness. In the projection type liquid crystal display apparatus wherein a plurality of the liquid crystal display apparatuses of the present invention are used and the picture images of the respective liquid crystal display apparatuses are synthesized for projection, the order of application of the image signals and the phase of the signals are optimally combined in each of the liquid crystal display apparatuses, whereby the flicker can be suppressed by forming a synthesized picture image. Specifically, in the projection type display apparatus comprising a plurality of the liquid crystal display apparatuses of the present invention, the liquid crystal display apparatuses are classified into first and second groups, and the two kinds of image signals are applied respectively to the first and second groups in the opposite order, whereby the flicker in the synthesized picture image can be suppressed. Namely, when the voltages are applied in the order of $+V_2 \rightarrow +V_1 \rightarrow -V_2 \rightarrow -V_1 \rightarrow$, the first group is applied with the voltages in the order of $+V_2 \rightarrow +V_1 \rightarrow -V_2 \rightarrow -V_1 \rightarrow$ and the second group is applied with the voltages in the Order of $-V_1 \rightarrow -V_2 \rightarrow +V_1 \rightarrow +V_2 \rightarrow$. As a result, the flicker is substantially inconspicuous when the picture images are overlaid.

When the liquid crystal display apparatuses are divided into two groups, it is unnecessary that the two kinds of applied voltages are entirely in agreement within the respective liquid crystal display apparatuses. When the signals are applied to the first group in the order of a high voltage→low voltage, the signals are applied to the second group in the order of a low voltage→a high voltage, i.e. the order of application of the voltages should be opposite between the first and second groups. Namely, the first group is applied with the voltages in the order of $+V_{21} \rightarrow +V_{11} \rightarrow -V_{21} \rightarrow -V_{11}$ ($V_{11} < V_{21}$) and the second group is applied with the voltages in the order of $-V_{12} \rightarrow -V_{22} \rightarrow +V_{12} \rightarrow +V_{22}$ ($V_{12} < V_{22}$).

It is in particular preferable that the phase is shifted for each unit of line and row in each group, specifically, the first voltage driving order of $+V_2 \rightarrow +V_1 \rightarrow -V_2 \rightarrow -V_1 \rightarrow$ is applied to the odd numbered lines of the first group and the even numbered lines of the second group, and the second voltage driving order of $-V_1 \rightarrow -V_2 \rightarrow +V_1 \rightarrow +V_2 \rightarrow$ is applied to the even numbered lines in the first group and the odd numbered lines of the second group. Further, the same effect can be obtained by reversing the order of application of the signals to rows instead of the lines of the picture elements of the liquid crystal display apparatus.

In a color projection type liquid crystal display apparatus in which three liquid crystal display apparatuses are used for red, green and blue colors, a display of a full-colored dynamic image having excellent gray scale level while suppressing the flicker and eliminating the image-sticking can be obtained by determining the G color as a first group and the R and B colors as a second group; by applying alternately two kinds of image signals subjected to amplitude modulation for each line (or each row), wherein the order of application of the signals is reversed between the first and second groups. In this case, of course, the three liquid crystal display apparatuses are divided into three groups, and the image signals are applied for driving with shifted phase.

FIG. 9 shows four picture elements $A_{11}$, $A_{12}$, $A_{21}$ and $A_{22}$ arranged in a square shape and three liquid crystal display apparatuses for R, G and B colors and the order of driving of the picture elements wherein numerals "1, 2, 3, 4" indicate the order of driving which are shown in Table 4.

TABLE 4

| Field | 1 | 2 | 3 | 4 |
|---|---|---|---|---|
| Order of driving 1 | $+V_2$ | $+V_1$ | $-V_2$ | $-V_1$ |
| Order of driving 2 | $+V_1$ | $+V_2$ | $-V_1$ | $-V_2$ |
| Order of driving 3 | $-V_2$ | $-V_1$ | $+V_2$ | $+V_1$ |
| Order of driving 4 | $-V_1$ | $-V_2$ | $+V_1$ | $+V_2$ |

The voltages $V_1$ and $V_2$ can be determined experimentally so as to obtain a good gray scale display. Generally, they are determined to have general relations of $2V_x^2 > V_2^2 > V_x^2$, $V_x > V_1 \geq 0$ with respect to an effective voltage $V_x$ which is capable of change from a scattering state to a state having a transmittance corresponding to the gray scale. In the determination of the $V_1$ and $V_2$, there may be $V_1 = V_2$ in a high transmittance region, as described before. Further, in a low transmittance region of about 20%, it is generally preferable to be $0.7 V_2 > V_1$.

Further, the liquid crystal display apparatuses may be driven by providing a state of $V_1 = 0$ V so as to return to a scattering state once. In this case, although light energy in average is reduced and there is a disadvantage of a dark picture image, the problem of hysteresis can be remarkably improved. Further, since there is no effect of $V_1$ with respect to the driving an alternating current, a round of application of the voltages can be completed in three fields. For instance, it is possible to use the order of driving of $0 \rightarrow V_2 \rightarrow -V_2$.

It is preferable that the voltages used in a high transmittance region having a small hysteresis have $0.5 V_2 < V_1$ so as not to greatly reduce the transmittance in an ON time.

Further, when the liquid crystal display apparatuses are driven with two kinds of voltages, a round of application of the voltages may have 6 fields but not 2 fields or 4 fields, namely, voltages are applied in the order of $-V_1 \rightarrow +V_2 \rightarrow +V_1 \rightarrow -V_1 \rightarrow -V_2 \rightarrow +V_1 \rightarrow$ wherein $V_1$ is used 4 times and $V_2$ is used twice.

In the above description, the order of driving is fixed. However, the order may be changed between the first round and the second round. For instance, in Table 4, the picture elements of "1" is driven by "order of driving 1" in the first round and is driven by "order of driving 3" in the second round. Further, in the present invention three or more voltages may be used instead of using the two voltages $V_1$ and $V_2$.

The present invention is applicable to various kinds of liquid crystal display apparatus and to a TV image display such as NTSC, a display for computer, another high density dynamic image display and so on. Since TVs have base frequencies, the response characteristics of a liquid crystal and solidified matrix composite material may be determined so as to meet the base frequencies. Further, it is possible that an image signal is once read in a memory to change a frequency for the TV.

When the present invention is used for another display, the characteristics of the liquid crystal and solidified matrix composite material used and the modulation of signals may be determined depending on the base frequency used, i.e. the field frequency. In this case, it is desirable to determine the characteristics of the liquid crystal and solidified matrix composite material and the driving method for signals in consideration of the number of the gray scale for a picture image to be expected.

As described above, in the present invention, a display of a dynamic image having excellent gray scale can be obtained in association with a conventional active element and a driving IC for a conventional TN type liquid crystal display element by optimizing the liquid crystal and solidified matrix composite material and by reducing the hysteresis of the material by utilizing an unique driving method.

It is preferable to use the liquid crystal display element which exhibits a scattering state (i.e. an opaque state) due to the difference between the refractive index of the liquid crystal which is not oriented in the direction of an electric field and the refractive index of the solidified matrix when the electric field is not applied.

When the liquid crystal element is used for a projection type display apparatus as in the present invention, light is scattered by a portion of the liquid crystal display element at which no electrode is located, and the portion looks dark because light does not reach a projection screen even when no light shielding layer is provided at the portion other than picture elements. In order to prevent light from leaking from any other portion of the liquid crystal display element than the picture element electrodes, it is unnecessary to provide a light shielding layer for the portion other than the picture element electrodes. Accordingly, there is an advantage that the step of forming the light shielding layer is unnecessary. Of course, the light shielding layer may be formed in order to minimize erroneous operations.

An electric field is applied to a desired picture element. At the picture element portion to which the electric field is applied, the liquid crystal is oriented so that the ordinary refractive index ($n_0$) of the liquid crystal and the refractive index ($n_p$) of the polymer matrix coincide with each other. Accordingly, the liquid crystal display element presents a transparent state, and light is transmitted through desired picture elements to thereby provide a bright display on a projection screen.

If the curable compound is cured during the curing step while a sufficiently high voltage is applied only to a specified portion of the element, the portion is formed to have a normally light transparent state. Accordingly, in a case that there is to form a fixedly display portion, such a normally transparent portion may be formed.

In the liquid crystal display element of the present invention, a colored display can be attained by providing a color filter. Color filters having three different colors may be provided in a single liquid crystal display element, or a color filter for a specified color may be provided in a single liquid crystal display element and three liquid crystal display elements having different color filters may be used in combination. The color filter may be provided on the surface having electrodes of the substrate or may be provided at the outside of the substrate.

Further, dye, pigment or the like may be mixed into the liquid crystal and solidified matrix composite material to conduct a color display.

The liquid crystal display element used for the present invention comprises the above-mentioned liquid crystal and solidified matrix composite material which is interposed between the active matrix substrate having an active element for each picture element electrode and the counter electrode substrate provided with a counter electrode.

Figure 10:
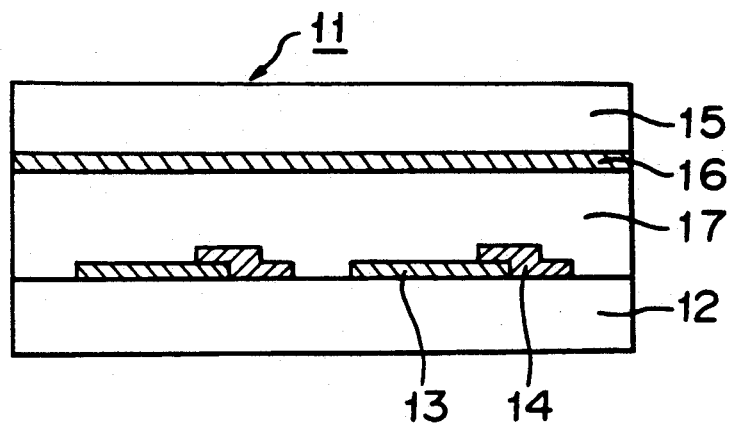
FIG. 10 is a cross-sectional view of an active matrix liquid crystal display element in accordance with the present invention.

FIG. 10 is a cross-sectional view showing an embodiment of the active matrix liquid crystal display element according to the present invention.

In FIG. 10, reference numeral 11 designates a liquid crystal display element, numeral 12 designates a substrate such as glass, plastics or the like which is used for an active matrix substrate, numeral 13 designates a picture element electrode such as ITO ($In_2O_3$-$SnO_2$), $SnO_2$ or the like, numeral 14 designates an active element such as transistor, a diode, a non-linear resistance element or the like, numeral 15 designates a substrate such as glass, plastics or the like which is used for a counter electrode substrate, numeral 16 designates a counter electrode such as ITO, $SnO_2$ or the like, and numeral 17 designates a liquid crystal and solidified matrix composite material interposed between the substrates 12, 15. A voltage is applied across the picture element electrode and counter electrode by means of a driving circuit (not shown).

In a case of using a three-terminal element such as a TFT (thin film transistor) as the active element, an entire surface electrode in common with all picture elements may be disposed for the counter electrode substrate. In the case of using a two-terminal element such as an MIM element or a PIN diode, however, the counter electrode substrate is applied with a stripe-like patterning.

In the case of using a TFT as the active element, silicon is suitable as the semiconductor material. Polycrystalline silicon is particularly preferred since it has less photosensitivity than in amorphous silicon and, accordingly, does not cause erroneous operation even without shielding light from a light source by means of a light shielding film. In the case of using polycrystalline silicon for the projection type liquid crystal display apparatus in the present invention, a strong light source for projection can be utilized and a bright display is obtainable.

Even in the case of using the amorphous silicon, if the light shielding film is formed at the semiconductor portion, the active matrix liquid crystal display element of the present invention can be used.

Further, the electrodes used are usually transparent electrodes. In the case of using the electrodes for a reflection type liquid crystal display apparatus, however, a reflection electrode made of a material such as Cr, Al or the like may be used. UV-ray cut filter or the like may be used in a lamination form, or characters, figures or the like may be printed, or a plurality of liquid crystal display elements may be used.

Further, in the present invention, a protective plate such as a glass plate, a plastic plate or the like may be overlaid on or at the outside of the liquid crystal display element. The protective plate reduces a danger of the breakage of the display element when the surface of the element is pushed, whereby the safety of the display element is improved.

In the case of using a photo-curable compound as a curable compound constituting the liquid crystal and solidified matrix composite material as described above in the present invention, photo-curable vinyl compound is preferably used.

Specifically, there can be exemplified a photo-curable acryl compound and, particularly, those containing acryl oligomer which is curable upon polymerization under the irradiation of light are particularly preferred.

The liquid crystal used in the present invention may be a nematic liquid crystal in which the refractive index is changed upon the application of a voltage in such a manner that in one state, the refractive indices of the liquid crystal and the solidified matrix substantially coincide, and in the other state, the refractive indices disagree. It is particularly preferable to use the nematic liquid crystal having a positive dielectric anisotropy wherein the solidified matrix coincides with the ordinary refractive index of the liquid crystal.

Such liquid crystal may be used solely or may be used as a composition, and the use of a composition can be advantageous for satisfying various demands such as for working temperature range, working voltage, etc.

When the photo-curable compound is used for the liquid crystal and solidified matrix composite material, it is preferable to uniformly dissolve the photo-curable compound in the liquid crystal. The cured material after exposure to light can not be dissolved or is hardly dissolved. When the above-mentioned composition is used, it is desirable to use the liquid crystal having a closer value in solubility.

The liquid crystal and solidified matrix composite material is prepared as follows. For instance, an active matrix substrate and a counter electrode substrate are arranged, and the surfaces with electrodes of the substrates are opposed; the circumferential portions of the two opposed substrates are sealed with a sealing material; a mixed solution of liquid crystal and curable compound is injected through an injection port followed by sealing the injection port. Or a mixture of liquid crystal and curable compound is supplied to one of the substrates, followed by overlaying the other so as to oppose each other, in the same manner as the conventional preparation of the liquid crystal display element.

For the liquid crystal display element of the present invention, dichroic dye, dye or pigment may be added to the liquid crystal, or a colored material may be used as a curable compound.

In the present invention, since the liquid crystal and solidified matrix composite material is used, a possibility that the upper and lower transparent electrodes may short-circuit can be reduced, and it is unnecessary to strictly control the orientation of the liquid crystal and the substrate gap as required for the conventional TN type display element. Accordingly, the liquid crystal display element capable of controlling a transparent state and a scattering state can be effectively produced.

The projection light source, the projection optical system, the projection screen and so on used in the present invention may be a conventionally used light source, projection optical system, projection screen and so on. It is enough that the liquid crystal display element is disposed between the projection light source and the projection optical system. In this case, the projection optical system may be used in such a manner that images from the plurality of the liquid crystal display elements are synthesized with use of an optical system and the synthesized image is projected.

In addition to the lamp or the combination of the lamp and the mirror or lens, a cooling system may be added, or a TV channel display devise such as an LED or the like may be added.

Figure 11:
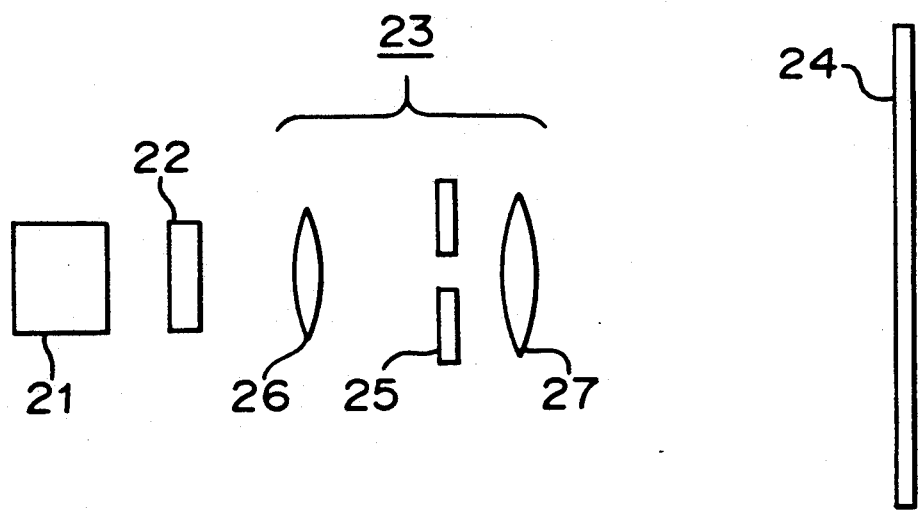
FIG. 11 is a diagram showing arrangement of the structural elements of a projection type active matrix liquid crystal display apparatus in which the active matrix liquid crystal display element shown in FIG. 10 is used.

FIG. 11 is a diagram showing an embodiment of the projection type active matrix liquid crystal display apparatus in which the active matrix liquid display element as shown in FIG. 10 is used.

In FIG. 11, reference numeral 21 designates a projection light source, numeral 22 designates a liquid crystal display element, numeral 23 designates a projection optical system including elements such as a lens, an aperture and so on, and numeral 24 designates a projection screen. In this embodiment, the projection optical system includes a device 25 for reducing diffusion light, such as an aperture or a spot, a focusing lens 26 and a projection lens 27.

Figure 12:
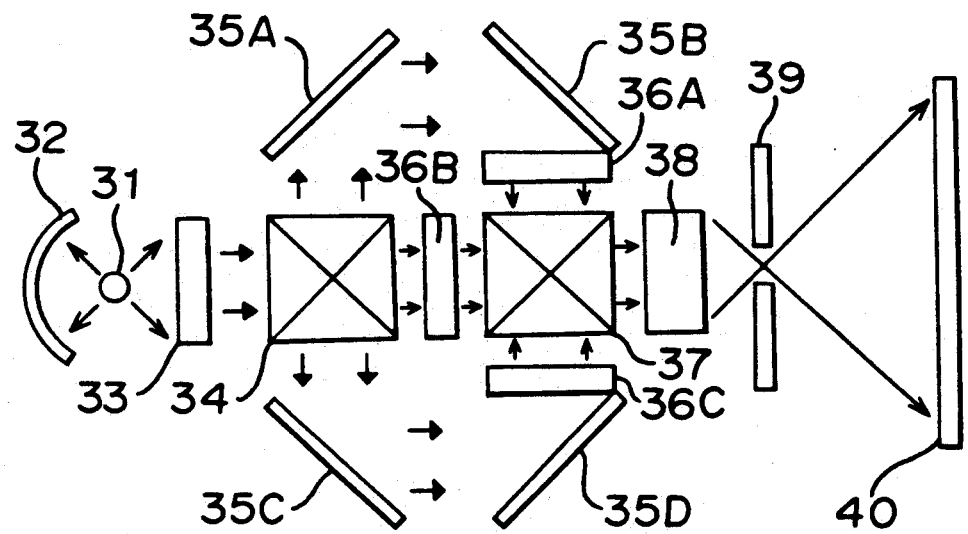
FIG. 12 is a diagram showing a full-colored projection type active matrix liquid crystal display apparatus in accordance with the present invention.

FIG. 12 is a diagram showing an embodiment of the full-color projection type active matrix liquid crystal display apparatus in which dichroic prisms are used, in accordance with the present invention.

In FIG. 12, reference numeral 31 designates a light source, numeral 32 designates a concave mirror, numeral 33 designates a condenser lens, numeral 34 designates a color splitting dichroic prism, numerals 35A, 35B, 35C, 35D designate mirrors, the elements 31 through 35D constituting a color light source, numerals 36A, 36B, 36C designate active matrix liquid crystal elements each having a liquid crystal and solidified matrix composite material corresponding to each color, numeral 37 designates a synthesizing dichroic prism, numeral 38 designates a projection lens, numeral 39 designates a device for reducing diffusion light for removing light other than straight-forward light and numeral 40 designates a projection screen, the elements 37 through 39 constituting a projection optical system.

In particular, in the case of using the projection type display, a device for reducing diffusion light, e.g. an aperture or a spot may be disposed on the optical path so that the contrast ratio of display can be increased. Namely, the device for reducing diffusion light may be such a device that among incident light passing though the liquid crystal display element, straight-forward light (light which has transmitted portions in which the picture element portions are in a transparent state) is taken, and non-straight-forward light (light scattered at portions in which the liquid crystal and solidified matrix composite material is in a scattering state) is diminished. In particular, the device which does not reduce the straight-forward light but reduces diffusion light on the non-straight-forward light, is preferred.

As a specified device, there is such a device comprising a liquid crystal display element and a projection optical system wherein light passing through the element is focused by a focusing lens, is passed through an aperture or a spot which is formed by perforating a plate material and is projected by means of a projecting lens.

In such a device, among light beams emitted from the projection light source to pass through the liquid crystal display element, straight-forward light beams in the incident light are gathered by the focusing lens, pass through a hole formed in the aperture or the spot and are projected through the projecting lens. On the other hand, light beams which are scattered in the element which are non-straight-forward light beams are focused at the focusing lens, however, and don't pass the hole formed in the aperture or the spot. Accordingly, the scattering light is not projected, and a projection picture image having a good contrast ratio is obtainable.

As another embodiment, a mirror having a small surface area may be obliquely disposed at the same position instead of using the aperture or the spot, whereby light reflected by the mirror is projected by a projecting lens located on the optical axis. Further, a spot or a mirror may be disposed at a position where light beams are focused by the projecting lens, without using the focusing lens.

The focal length or the diameter of the projecting lens may be suitably selected so as to remove scattering light, without using a specially arranged aperture.

Further, a microlens system can be used. Specifically, a combination of a microlens array and a spot array in which fine holes are formed in array may be disposed at the side of the projection optical system with respect to the liquid crystal display element to thereby remove needless scattering light. This arrangement has an advantage of reducing the entire size of the projection type display apparatus because the optical path length necessary for removing scattering light can be remarkably shortened. In order to reduce the optical path length, the installation of the scattering light removing system in the projection optical system is an effective way. The structure of projection type display apparatus in which the scattering light removing system is installed in the projection optical system is simpler than the structure in which the projection optical system and the scattering light removing system are independently disposed, whereby the entire size of the apparatus can be reduced.

These systems may be used in combination with a mirror, a dichroic mirror, a prism, a dichroic prism, a lens and so on to synthesize a picture image and to display a colored image. Further, a colored picture image is obtainable by combining the optical system with a color filter.

The ratio of the scattered light component and the straight-forward light component reaching on the projection screen can be controlled by adjusting the diameter of the spot or the mirror and the focal length of the lens, so that a desired contrast ratio of display and the brightness in display can be obtained.

When the device for reducing diffusion light is used, light entering from the projection light source to the liquid crystal display element should be parallel in order to increase the brightness of display. For this, it is preferable to constitute a projection light source by combining a light source capable of providing high brightness (which should be a point light source), a concave mirror, a condenser lens and so on.

Description has been made mainly as to the projection type display apparatus having a transparent type structure. However, the present invention is applicable to a projection type display apparatus having a reflection type structure wherein a small mirror is disposed, instead of a spot, to take out only necessary light.

In accordance with the present invention, a plurality of voltages are applied to thereby reduce image-sticking caused due to hysteresis and a display having a high contrast ratio is obtainable. In particular, when the present invention is applied to a projection type display, the transparent-scattering type liquid crystal display element permits light to pass through portions which are in a transparent state whereby a bright display is provided on the projection screen, whereas it causes scattering of light at portions which are in a scattering state whereby a dark display is provided on the projection screen. Thus, a display of high brightness and a high contrast ratio is obtainable.

Further, in the present invention, a display having a fine gray scale can be easily attained by using an active element and driving IC which has been used for the conventional TN active matrix liquid crystal display element.

In the following, the present invention will be described more in detail in connection with various examples.

EXAMPLE 1

Chrome was vapor-deposited to a thickness of 60 nm on a glass substrate ("7059" substrate manufactured by Corning), and the article was patterned to form gate electrodes. Then, a silicon oxynitride film and an amorphous silicon film were deposited by using a plasma CVD apparatus. Then, after annealing with use of a laser, a patterning operation was conducted to form polysilicon. Phospher-doped amorphous silicon and chrome were deposited on the polysilicon using the plasma CVD and a vapor-deposition apparatus. A patterning operation was conducted to cover the polysilicon to form source electrodes and drain electrodes for the first layer. Further, vapor-deposition of ITO ($In_2O_3$-$SnO_2$) was conducted. Then, the article was patterned to form picture element electrodes. Then, chrome and aluminum were successively vapor-deposited. A patterning operation was conducted to form the second layer of the source electrodes, and the second layer of the drain electrodes so as to connect the picture element electrodes with the first layer of drain electrodes. Then, a silicon oxynitride film was deposited to form a protective layer by using the plasma CVD apparatus to thereby form an active matrix substrate.

A counter electrode substrate was prepared by using the same glass substrate as used for the active matrix substrate, on the entire surface of which an ITO electrode was formed. The counter electrode substrate and the previously prepared active matrix substrate were disposed so as to face the electrode surfaces of the both substrates. Spacers each having diameter of about 11.0 μm were placed in the space between the substrates. The peripheral portions of the substrates were sealed with a sealing material of an epoxy series resin except at the location of an injection port to produce an empty cell having a gap of 11.0 μm.

A nematic liquid crystal, acrylate monomer, bifunctional urethane acrylate oligomer and a photo-cure initiator were uniformly dissolved to prepare a solution of liquid crystal and solidified matrix composite material. The solution was injected in the cell, and the cell was exposed to UV rays to form the liquid crystal and solidified matrix composite material to thereby complete an active matrix liquid crystal display element.

A video signal having the waveform (one round for 4 fields) as shown in FIG. 1 was formed and the liquid crystal display element was driven by the video signal. In the driving, the maximum driving voltage was 8 V, the field period was about 16.7 msec and the relation of $V_1$ to $V_2$ was such as shown in FIG. 7. The voltage at which $V_2$ is crossed to the voltage axis was determined to be 1 V, the voltage at which $V_1$ and $V_2$ coincide was 5.5 V and $V_2$ given when $V_1$ became 0 V was 2.8 V.

The response time of the element used (a time corresponding to a 90% change in the entire change of transmittance) was 20 msec under the condition of 0 V→8 V, 100 msec under 0 V→4.5 V, 16 msec under 8 V→0 V and 15 msec under 4.5 V→0 V respectively.

As a result, a picture image having excellent half tone and free from image-sticking could be obtained. When the picture image was projected with use of a projection light source and a projection optical system, a display having a contrast ratio of 100 or higher could be obtained. There was little flicker.

COMPARATIVE EXAMPLE 1

The liquid crystal display element prepared in accordance with Example 1 was driven by an ordinary video signal. It was found that when a picture having a large difference between brightness and darkness was changed to a picture having a slight dark tone, there was a slight amount of sticking of the image displayed just before.

EXAMPLE 2

The liquid crystal display element of Example 1 was driven in the substantially same manner as Example 1 except that the relation between $V_1$ and $V_2$ was slightly changed from that shown in FIG. 7. Namely, $V_2$ was the same as that of FIG. 7, but for $V_1$ which has a crossing point on the gray scale axis, it was determined that when $V_2$ was 5.5 V, $V_1$ was 4.5 V, and in the higher transmittance region from the defined $V_1$ and $V_2$, the value $V_2 \rightarrow V_1$ was always 1 V.

As a result, a picture image having an excellent half tone and free from image-sticking could be obtained. When the picture image was projected with use of the projection light source and the projection optical system, a display having a contrast ratio of 100 or higher was obtained, but a slight amount of flicker was found.

When the same liquid crystal display element was driven with the same relation of $V_1$ and $V_2$ provided that it was driven in the order of $V_1 \rightarrow V_2$ for the odd numbered lines and in the order of $V_2 \rightarrow V_1$ in the even numbered lines, the flicker was reduced. Further, when the same element was driven with the same relation of $V_1$ and $V_2$ provided that there were the order of $V_1 \rightarrow V_2$ for the odd numbered lines, the order of $V_2 \rightarrow V_1$ in the even numbered lines, the order of positive→negative in symbol for the odd numbered rows and the order of negative→positive in symbol for the even numbered rows, there was found substantially no flicker.

EXAMPLE 3

The liquid crystal display element of Example 1 was driven wherein $V_1 = 0$ V and one round is formed by 3 fields. As a result, a display of a picture image having an excellent half tone and image-sticking lesser than that in Example 1 was obtained. When the picture image was projected with use of the projection light source and the projection optical system, a display having a contrast ratio of 100 or higher was obtained, however, the picture image became slightly dark.

EXAMPLE 4

The same liquid crystal display element as in Example 1 was driven by using three kinds of voltage $V_1$, $V_2$ and $V_3$ wherein $V_1$ and $V_2$ were the same as those in Example 1, and $V_3$ was determined to be an intermediate value between $V_1$ and $V_2$. One round was formed by 6 fields. As a result, a display of a picture image having an excellent half tone and free from image-sticking was obtained. When the picture image was projected with use of the projection light source and the projection optical system, a display having a contrast ratio of 100 or higher was obtained.

EXAMPLE 5

Three liquid crystal display elements were prepared in the substantially same manner as Example 1 and these elements were used for R, G and B colors respectively. They had the liquid crystal and solidified matrix composite material and the electrode gap which were so adjusted as to be optimized to the colors used, and they had substantially equal voltage-transmittance curves when they were driven with a voltage in a range of 0–8 V. A projection type liquid crystal display apparatus was formed with use of these three elements, a projection light source, a projection optical system, a color-splitting dichroic mirror, a color synthesizing dichroic mirror and so on.

When two kinds of video signal, which were subjected to the same modulation as that of Example 2, were applied to the elements for the R, G and B colors in the same order of application as that of Example 2, a full-colored dynamic display having little flicker was obtained on a screen.

EXAMPLE 6

The same liquid crystal display apparatus as in Example 5 was driven in the substantially same manner as Example 5 wherein the element for the G color was in the first group and the elements for the R and B colors were in the second group, and the order of the application of $V_1$ and $V_2$ for the lines was inversed. When a picture image was projected on the screen, a full-colored dynamic display free from image-sticking was obtained wherein observers didn't recognize a flicker.

EXAMPLE 7

The same liquid crystal display element as Example 1 was prepared and it was driven by applying voltages $V_1$ and $V_2$ in which $V_1$ and $V_2$ had the relation as shown in FIG. 6 and $V_2-V_1$ always assumed 1 V. The voltage-transmittance characteristics of the liquid crystal and solidified matrix composite material used were such that the threshold voltage ($V_{th}$) was 3.5 V, $V_{50A}$ was 5.5 V, $V_{50B}$ was 5.1 V, $\Delta V_{AV}$ was 1 V ($=V_2-V_1$) and $\Delta V_{50}$ was 0.4 V ($=V_{50A}-V_{50B}$) wherein $\Delta V_{AV} > \Delta V_{50}$ was satisfied. When the above-mentioned driving was conducted, the image-sticking due to hysteresis could be almost eliminated in the entire region of gray scale, and a gray scale display with fineness was achieved.

EXAMPLE 8

The substantially same liquid crystal display element as in Example 5 was prepared and driven wherein $\Delta V_{AV}$ was 0.3 V ($=V_2-V_1$), $\Delta V_{50}$ was 0.4 V ($=V_{50A}-V_{50B}$) and the relation of $\Delta V_{AV} < \Delta V_{50}$ was satisfied. The above-mentioned driving was conducted. Although the image-sticking due to hysteresis was fairly improved, a slight amount of image-sticking was found at the time of changing a special image. The brightness at the time of applying a voltage ($V_2 = 8$ V, i.e. entire ON time) was not substantially changed in the same manner as Example 7.

In the liquid crystal display element of the present invention, since a liquid crystal and solidified matrix composite material which electrically controls a scattering state and a transparent state is used as a liquid crystal material, and the liquid crystal and solidified matrix composite material is held between an active matrix substrate and a counter electrode substrate, polarization plates are unnecessary, whereby the transmittance of light in a light-transparent time can be remarkably improved and a bright picture image is obtainable.

The liquid crystal display element of the present invention exhibits a high scattering property under the condition that no electric field is applied and a high transparent property under the condition that an electric field is applied by means of the active element. Accordingly, it has a high contrast ratio and a display of high brightness is possible even when a conventional driving IC for a TN type liquid crystal display element is used.

In the gray scale driving of the liquid crystal display element, a gray scale display having a beautiful half tone can be obtained while there is little residual image. Further, the image-sticking phenomenon due to hysteresis can be reduced. Accordingly, the liquid crystal display element of the present invention is effectively used for a projection type display having brightness and a high contrast ratio and free from the image-sticking. Further, it is possible to reduce the size of the light source.

Further, since it is unnecessary to use the polarization plates, the wavelength dependency of the optical characteristics is small and there is little requirement for color correction for the light source.

Further, possible problems of orientation processing such as rubbing necessary for the TN type liquid crystal display element and destruction of the active element due to the orientation processing and static electricity generated from the processing can be avoided, and the yield of production of the liquid crystal display elements can be improved significantly.

Since the liquid crystal and solidified matrix composite material is formed in a form of film after curing, such problems as short-circuiting between the substrate by a pressure applied thereon and destruction of the active elements by displacement of spacers can be minimized.

Further, the liquid crystal and solidified matrix composite material is similar in specific resistance to that in the conventional TN mode, and a great storage capacitor need not be provided for each picture element as in the DS mode. Accordingly, designing of the active elements can be facilitated and the ratio of an effective picture element electrode area can be increased, and power consumption of the liquid crystal display element can be small.

The liquid crystal display element which employs the liquid crystal and solidified matrix composite material has a feature that the response time is short, and a display of dynamic picture can be made easily. Further, since the electric-optical characteristics (voltage-transmittance dependence) of the liquid crystal display element is looser than a conventional liquid crystal display element of the TN mode, it can be easily applied to display gray scale.

In addition, since the liquid crystal display element of the present invention is rendered to be in a transparent state upon application of an electric field, light is scattered by a portion to which no electric field is applied and there is no leak of light upon projection of light even if a light shielding layer for interrupting light is not provided at the portion other than picture elements. Accordingly, there is no necessity of provision of a light shielding means between adjacent picture elements. Accordingly, where an active element made of polysilicon is used, a projection light source of a high brightness can be used without using a light shielding layer or with a thin light shielding layer to the active element, whereby a projection type liquid crystal display apparatus of a high brightness can be easily obtained. Further, no light shielding layer is necessary in this instance, and accordingly, the process of production can be simplified.

In the present invention, various applications are possible as far as the effect by the present invention is not injured.

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display apparatus for displaying images in a gray scale, comprising:

an active matrix substrate;

a plurality of active elements formed on the active matrix substrate;

a plurality of picture element electrodes formed on the active matrix substrate, each picture element electrode being connected to a corresponding active element;

a counter electrode substrate;

a counter electrode formed on the counter electrode substrate;

a liquid crystal and solidified matrix composite material disposed between the active matrix substrate and counter electrode substrate, which comprises a nematic liquid crystal dispersed and held in the solidified matrix, the nematic liquid crystal having a refractive index which changes depending on a voltage applied thereto, wherein with a first voltage state applied thereto, the refractive index of the liquid crystal substantially coincides with that of the solidified matrix to thereby pass light, and with a second voltage state applied thereto, the refractive index of the liquid crystal does not coincide with that of the solidified matrix to thereby scatter light; and a driving circuit for applying a voltage to the plurality of active elements, plurality of picture elements and counter electrode to drive the liquid crystal in the first voltage state and second voltage state, the applied voltage comprising a first voltage signal $V_1$ and a second voltage signal $V_2$, the first and second voltage signals being a function of a grade of the gray scale display.

2. The liquid crystal display apparatus according to claim 1, wherein said nematic liquid crystal has a positive dielectric anisotropy and said solidified matrix is a polymer matrix, and wherein the refractive index of the polymer matrix substantially agrees with an ordinary refractive index ($n_o$) of the nematic liquid crystal.

3. The liquid crystal display apparatus according to claim 1, wherein a phase of the applied voltage is deviated between adjacent picture elements.

4. The liquid crystal display apparatus according to claim 1, wherein the first voltage signal has a positive voltage $V_1$ and a negative voltage $-V_1$, and the second voltage signal has a positive voltage $V_2$ and a negative voltage $-V_2$, the applied voltage being applied to four adjacent picture element so that one round of the applied voltage to the four adjacent picture elements is completed in four fields.

5. The liquid crystal display apparatus according to claim 4, wherein the four adjacent picture elements are formed in four adjacent lines.

6. The liquid crystal display apparatus according to claim 4, wherein the four adjacent picture elements are formed in four adjacent rows.

7. The liquid crystal display apparatus according to claim 4, wherein the four adjacent picture elements are arranged at crossing points of two adjacent lines and two adjacent rows.

8. The liquid crystal display apparatus according to claim 1, wherein a voltage difference $\Delta V$ between voltages $V_1$ and $V_2$, where $V_1 < V_2$ and $\Delta V = V_2 - V_1$, is a constant in a region of $V_1 \geq 0$ V.

9. The liquid crystal display apparatus according to claim 1, wherein a voltage difference $\Delta V$ between voltages $V_1$ and $V_2$, where $V_1 < V_2$ and $\Delta V = V_2 - V_1$, gradually increases as the applied voltage is reduced in a region of $V_1 \geq 0$ V.

10. The liquid crystal display apparatus according to claim 1, wherein the following relations are satisfied:

$$V_z \leq V_1 < V_2$$

wherein $V_z$ is defined by the following relations:

$$V_x = 0.5 \times V_{90A}(V_2 - V_{50A})/(V_{90A} - V_{50A})$$

$$V_z = V_x \text{ for } V_x \geq 0 \text{ and}$$

$$V_z = 0 \text{ for } V_x < 2\ 0$$

and $V_{50A}$ and $V_{90A}$ are voltages corresponding to respective 50% and 90% transmission of the liquid crystal display in a saturated transmission state.

11. A projection type liquid crystal display apparatus, for displaying images in a gray scale, comprising:
an active matrix substrate;
a plurality of active elements formed on the active matrix substrate;
a plurality of picture element electrodes formed on the active matrix substrate, each picture element electrode being connected to a corresponding active element;
a counter electrode substrate;
a counter electrode formed on the counter electrode substrate;
a liquid crystal and solidified matrix composite material disposed between the active matrix substrate and the counter electrode substrate, which comprises a nematic liquid crystal dispersed and held in the solidified matrix, the nematic liquid crystal having a refractive index which changes depending on a voltage applied thereto, wherein with a first voltage state applied thereto, the refractive index of the liquid crystal substantially coincides with that of the solidified matrix to thereby pass light, and with a second voltage state applied thereto, the refractive index of the liquid crystal does not coincide with that of the solidified matrix to thereby scatter light;
a driving circuit for applying a voltage to the plurality of active elements, plurality of picture elements and counter electrode to drive the liquid crystal in the first voltage state and second voltage state, the applied voltage comprising a first voltage signal $V_1$ and a second voltage signal $V_2$, the first and second voltage signals $V_1$ and $V_2$ being a function of a grade of the gray scale display;
a projection light source system; and
a projection optical system.

12. A projection type liquid crystal display apparatus which comprises:
a liquid crystal display apparatus claimed in claim 11,
a projection light source system, and
a projection optical system, wherein three liquid crystal display elements are used for red, green and blue colors and the phase of voltage groups applied to the same picture element is deviated for each of the colors.

13. The projection type liquid crystal display apparatus according to claim 11, wherein said nematic liquid crystal has a positive dielectric anisotropy and said solidified matrix is a polymer matrix, and wherein the refractive index of the polymer matrix substantially agrees with an ordinary refractive index ($n_0$) of the nematic liquid crystal.

14. The projection type liquid crystal display apparatus according to claim 11, wherein a phase of the applied voltages is deviated between adjacent picture elements.

15. The projection type liquid crystal display apparatus according to claim 11, wherein the first voltage signal has a positive voltage $V_1$ and a negative voltage $-V_1$, and the second voltage signal has a positive voltage $V_2$ and a negative voltage $-V_2$, the applied voltage being applied to four adjacent picture element so that one round of the applied voltage to the four adjacent picture elements is completed in four fields.

16. The projection type liquid crystal display apparatus according to claim 15, wherein the four adjacent picture elements are formed in four adjacent lines.

17. The projection type liquid crystal display apparatus according to claim 15, wherein the four adjacent picture elements are formed in four adjacent rows.

18. The projection type liquid crystal display apparatus according to claim 15, wherein the four adjacent picture elements are arranged at crossing points of two adjacent lines and two adjacent rows.

19. The projection type liquid crystal display apparatus according to claim 11, wherein a voltage different $\Delta V$ between voltages $V_1$ and $V_2$, where $V_1 < V_2$ and $\Delta V = V_2 - V_1$, is a constant in a region of $V_1 \geq 0$ V.

20. The projection type liquid crystal display apparatus according to claim 11, wherein a voltage difference $\Delta V$ between voltage $V_1$ and $V_2$, where $V_1 < V_2$ and $\Delta V = V_2 - V_1$, gradually increases as the applied voltage is reduced in a region of $V_1 \geq 0$ V.

21. The projection type liquid crystal display apparatus according to claim 11, wherein the following relations are satisfied:

$$V_z \leq V_1 < V_2$$

wherein $V_z$ is defined by the following relations:

$$V_x = 0.5 \times V_{90A}(V_2 - V_{50A})/(V_{90A} - V_{50A})$$

$$V_z = V_x \text{ for } V_x \geq 0 \text{ and}$$

$$V_z = 0 \text{ for } V_x < 0$$

and $V_{50A}$ and $V_{90A}$ are voltages corresponding to respective 50% and 90% transmission of the liquid crystal display in a saturated transmission state.

22. The projection type liquid crystal display apparatus according to claim 11, wherein the projection optical system comprises three liquid crystal display elements used for red, green and blue colors.

23. A liquid crystal display apparatus comprising:
an active matrix substrate;
a plurality of active elements formed on the active matrix substrate;
a plurality of picture element electrodes formed on the active matrix substrate, each picture element electrode being connected to a corresponding active element;
a counter electrode substrate;
a counter electrode formed on the counter electrode substrate;
a liquid crystal and solidified matrix composite material disposed between the active matrix substrate and counter electrode substrate, which comprises a nematic liquid crystal dispersed and held in the solidified matrix, the nematic liquid crystal having a refractive index which changes depending on a voltage applied thereto, wherein with a first voltage state applied thereto, the refractive index of the liquid crystal substantially coincides with that of the solidified matrix to thereby pass light, and with a second voltage state applied thereto, the refractive index of the liquid crystal does not coincide with that of the solidified matrix to thereby scatter light; and
a driving circuit for applying a voltage to the plurality of active elements, plurality of picture elements and counter electrode to drive the liquid crystal in the first voltage state and second voltage state, the applied voltage comprising a plurality of positive voltage levels and a plurality of negative voltage levels.

24. The liquid crystal display apparatus according to claim 23, wherein said nematic liquid crystal has a positive dielectric anisotropy and said solidified matrix is a polymer matrix, and wherein the refractive index of the polymer matrix substantially agrees with an ordinary refractive index ($n_0$) of the nematic liquid crystal.

25. The liquid crystal display apparatus according to claim 23, wherein a phase of the applied voltage is deviated between adjacent picture elements.

26. The liquid crystal display apparatus according to claim 23, wherein the applied voltage has a lower positive voltage $V_1$, a higher positive voltage $V_2$, a lower negative voltage $-V_1$ and a higher negative voltage $-V_2$, the applied voltage being applied to four adjacent picture element so that one round of the applied voltage to the four adjacent picture elements is completed in four fields.

27. The liquid crystal display apparatus according to claim 26, wherein the four adjacent picture elements are formed in four adjacent lines.

28. The liquid crystal display apparatus according to claim 26, wherein the four adjacent picture elements are formed in four adjacent rows.

29. The liquid crystal display apparatus according to claim 26, wherein the four adjacent picture elements are arranged at crossing points of two adjacent lines and two adjacent rows.

30. The liquid crystal display apparatus according to claim 26, wherein a voltage difference $\Delta V$ between voltages $V_1$ and $V_2$, where $V_1 < V_2$ and $\Delta V = V_2 - V_1$, is a constant in a region of $V_1 \geq 0$ V.

31. The liquid crystal display apparatus according to claim 26, wherein a voltage difference $\Delta V$ between voltages $V_1$ and $V_2$, where $V_1 < V_2$ and $\Delta V = V_2 - V_1$, gradually increases as the applied voltage is reduced in a region of $V_1 \geq 0$ V.

* * * * *